United States Patent

Gloceri

Patent Number: 5,265,944
Date of Patent: Nov. 30, 1993

[54] WHEEL SPEED VERIFICATION SYSTEM

[75] Inventor: Gary J. Gloceri, Granger, Ind.

[73] Assignee: Allied-Signal, Inc., Morristown, N.J.

[21] Appl. No.: 998,073

[22] Filed: Dec. 28, 1992

Related U.S. Application Data

[62] Division of Ser. No. 763,708, Sep. 23, 1991, Pat. No. 5,193,886.

[51] Int. Cl.$^5$ ................................................. B60T 8/78
[52] U.S. Cl. ......................................... 303/92; 303/95; 364/426.02
[58] Field of Search ...................... 303/92, 95, 96, 100, 303/103, 110, 111; 364/426.01–326.03

[56] References Cited

U.S. PATENT DOCUMENTS

| | | | |
|---|---|---|---|
| 4,270,809 | 6/1981 | Ohmori et al. | 303/92 |
| 4,425,622 | 1/1984 | Arikawa | 364/426.02 |
| 4,499,543 | 2/1985 | Matsuda | 303/92 X |
| 4,546,437 | 10/1985 | Bleckmann et al. | 303/95 X |
| 4,629,259 | 12/1986 | Bräuninger | 303/109 |
| 4,709,341 | 11/1987 | Matsuda | 364/550 |
| 4,773,072 | 9/1988 | Fennel | 364/426.03 X |
| 4,916,698 | 4/1990 | McCann | 364/426.01 X |
| 4,917,443 | 4/1990 | Kramer et al. | 303/92 |
| 5,001,641 | 3/1991 | Makino | 364/426.02 |
| 5,074,626 | 12/1991 | Kramer et al. | 303/92 |

FOREIGN PATENT DOCUMENTS

| | | |
|---|---|---|
| 0070961 | 2/1983 | European Pat. Off. |
| 0379669 | 8/1990 | European Pat. Off. |
| 0395829 | 11/1990 | European Pat. Off. |
| 2241123 | 8/1991 | United Kingdom |

Primary Examiner—Robert J. Oberleitner
Assistant Examiner—Alfred Muratori
Attorney, Agent, or Firm—Larry J. Palguta; Ken C. Decker

[57] ABSTRACT

An anti-skid control circuit for a wheeled vehicle and a method of processor computation confirmation within such an anti-skid control circuit includes the confirmation of proper processor operation only at a certain one of the computation values. Rotation of a vehicle wheel provides a pulse train the repetition rate of which is indicative of the vehicle speed. A sequence of program steps is repetitively executed in a microprocessor (17) over a fixed time interval with the microprocessor (17) repeating that same predetermined sequence of program steps during each successive said fixed time interval. A second pulse train is provided having one pulse for each repetition of the sequence of program steps. The speed of at least one vehicle wheel is repetitively computed according to the repetition rate of the first pulse train and the repetition rates of the first and second pulse trains are compared, and corrective action is initiated in the event that the compared repetition rates differ by more than a prescribed amount. The comparison is effected only at a certain specific wheel speed. Alternatively, a computed wheel speed may be compared to the fixed time interval and the anti-skid circuit allowed to continue in operation only so long as the compared wheel speed and time interval are within predetermined limits of one another. Again, the step of comparing is effected only at a certain specific wheel speed.

6 Claims, 2 Drawing Sheets

WHEEL SPEED VERIFICATION SYSTEM

This is a divisional of co-pending application Ser. no. 07/763,708 filed on Sep. 23, 1991 now U.S. Pat. No. 5,193,886.

SUMMARY OF THE INVENTION

The present invention relates generally to vehicular braking systems and more particularly to vehicle braking systems having anti-skid features.

Automobile drivers accustomed to driving under snowy or icy conditions are familiar with the technique of "pumping" the brake pedal so as to cyclically increase and decrease the braking force exerted on the wheels such that a slipping wheel having a tendency to lock is permitted to re-accelerate back to speed corresponding to the speed of the vehicle. Such a driver induced anti-skid or antilock technique is simulated by many known anti-skid devices For example, U.S. Pat. No. 2,957,659 adapts known skid-preventing techniques where a skid preventing apparatus controls a solenoid anti-skid valve by detecting the initiation of wheel skidding due to the application of excessive brake pedal pressure, automatically enables the solenoid and releases the brakes allowing recovery of wheel speed, and then detects the ensuing acceleration of the wheel to de-energize the solenoid and reapply the brakes. U.S. Pat. No. 3,776,605 illustrates an attempt to provide an electro-hydraulic braking system having anti-skid capabilities which has the "feel" of a conventional purely hydraulic system. In this patented arrangement, the brake pedal is manually controlled against a spring force to develop an electrical signal which is directly proportional to the degree of pedal depression. A signal inversely proportional to the degree of skid of the wheels is generated and compared to this signal and the lower of the two is selected to drive an electrohydraulic valve which controls hydraulic pressure to the brakes.

An error in, for example, the computation of wheel speed in such antilock braking systems could be disastrous. An error in wheel speed determination may cause erroneous antilock cycling resulting in increased distance on what should have been a non-antilock stop. In the worst case, should the system falsely detect a wheel as being locked (zero speed) the system could release the braking pressure so that despite operator brake pedal pressure, no braking occurs.

U.S. Pat. No. 4,546,437 addresses the question of reliability of a brake slip control apparatus by providing redundant microprocessors operating under the same software. When inconsistent results are recognized, the brake slip control circuit is disabled and an error signal occurs. A similar approach is disclosed in U.S. Pat. No. 4,113,321 wherein a secondary circuit identical to the primary arithmetic circuit is utilized. The outputs of the primary and secondary circuits are compared and if an error occurs in either the comparator detects the error and renders the anti-skid system inoperable.

Many different types of wheel speed (or position) sensing transducers are known not only for conventional odometer and speedometer indication applications, but also for use in controlling the operation of vehicle anti-skid systems. For example, U. S. Pat. No. 3,949,252 discloses wheel hubcap mounted permanent magnets and a sensing coil fixed to the axle adjacent the hubcap in which a series of pulses are induced as the wheel rotates. Such an arrangement is essentially an alternating current generator having an output frequency proportional to the angular velocity of the wheel, and since the effective wheel diameter is known, also proportional to vehicle speed.

U.S. Pat. No. 4,767,164 discloses an optical wheel speed sensor for use in an anti-skid system utilizing a rotating disk having alternate reflective and transmissive segments along with a single optical fiber which both conducts light to the wheel and provides a return path for a modulated light wave having a component the frequency of which is proportional to wheel speed.

While complete redundancy has some merit, it is costly to implement. It would be desirable to provide adequate error checking on processor computations in an antilock braking system without the need for complete redundancy. Applicant's assignee currently manufactures an anti-skid electronic control unit having two microprocessors, one of which is a small, inexpensive microprocessor that is used to confirm that the primary relatively costly processor (controller) is executing its instructions in proper order and to provide a statistical check on valve signals from that main controller. This failsafe processor lacks the capacity or speed to independently compute wheel speed and, thus, does not currently confirm the accuracy of the main processor's wheel speed determination.

Among the several objects of the present invention may be noted the provision of an economical wheel speed computation confirmation system in a brake control system; the provision of an antilock braking system control circuit with wheel speed computation confirmation; the provision of an antilock braking system control circuit which allows the use of a modest capacity processor to confirm a computation made by a processor of significantly greater capacity; the provision of a technique which extends the error checking capabilities of existing antilock braking system control circuits; and the provision of a processor computation confirmation technique where confirmation occurs only at certain ones of the computation values. These as well as other objects and advantageous features of the present invention will be in part apparent and in part pointed out hereinafter.

In general, a combined brake and anti-skid controller for a wheeled vehicle has an anti-skid control circuit which includes an encoder for sensing rotation of a vehicle wheel and providing a first pulse train the repetition rate of which is indicative of the vehicle speed as well as a first processor for repetitively executing a sequence of program steps over a fixed time interval. The processor repeats the same predetermined sequence of program steps during each successive said fixed time interval. There is a second pulse train generator which is responsive to operation of the first processor for providing a second pulse train having one pulse for each repetition of the sequence of program steps. A second processor is instructed to compute wheel speed in response to a command from the first processor upon the first processor's detection of a certain wheel speed on a particular wheel. The second processor repetitively computes wheel speed specifically requested by the first processor. As an alternative, and in response to computation of a specific wheel speed by the first processor, a comparison of the specific wheel speed to the fixed time interval of the second processor may be effected and the anti-skid circuit allowed to continue in operation only so long as the compared specific wheel speed and time interval are within predetermined limits of one another.

Also in general in one form of the invention, a method of confirming a wheel speed determination includes the steps of determining the rate at which a processor repetitively cycles through a list of instructions and selecting a particular wheel speed at which confirmation is to be effected. The selected particular wheel speed value is typically integrally related to the determined rate. The wheel speed determination at the selected particular wheel speed is compared with the rate at which the processor repetitively cycles through the list of instructions and control of the braking force in an antilock braking system is interrupted in the event the comparison fails to confirm the wheel speed determination. Rotation of a vehicle wheel provides a pulse train the repetition rate of which is indicative of the vehicle speed and the comparison is between the pulse train repetition rate and the rate at which the processor is repetitively cycling through its list of instructions. Alternatively, the comparison may be between the computed wheel speed and the determined rate at which the processor repetitively cycles through its list of instructions.

BRIEF DESCRIPTION OF THE DRAWINGS

Like reference numbers identify like components in the drawing FIGURES.

The exemplifications set out herein illustrate a Preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
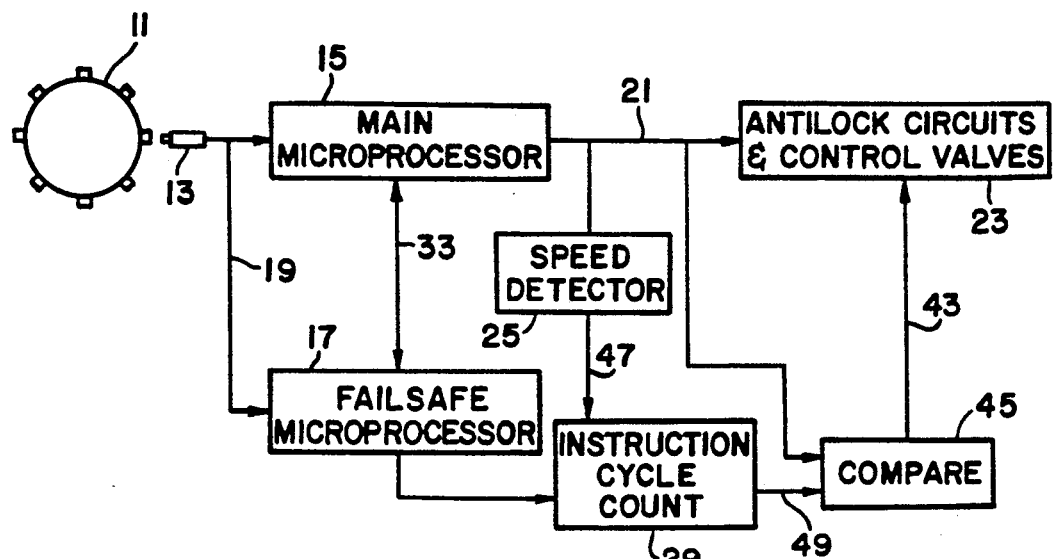
FIG. 1 is a schematic representation of an antilock brake electronic control system incorporating the present invention in one form.

In FIG. 1, a wheel speed encoding wheel 11 is fixed to rotate with a particular vehicle wheel. It will be understood that there may be four such encoding wheels, each associated with a particular vehicle wheel. The wheel has a series of teeth the passage of which is detected by magnetic pickup 13. Thus, the signal on line 19 is a pulse train having a repetition rate indicative of the speed of the vehicle wheel. While the number is arbitrary, eight teeth are shown in FIG. 1, hence the repetition rate of the pulse train on line 19 is eight times the number of revolutions per second of the wheel.

In prior art antilock braking systems, main processor 15 computes the wheel speed which is used to control the antilock circuits and control valves 23 in known manner while failsafe processor 17 confirms that processor 15 has executed its instructions in the proper order as well as checking of valve control signals from the main processor, and other ministerial functions. This known prior art antilock braking system does not confirm the computation of wheel speed by processor 15 because processor 17 is of limited capacity and is not capable of effecting that redundant computation sufficiently rapidly.

The present invention provides for a confirmation of the wheel speed indication on line 21 by sensing for a particular frequency (wheel speed) on that line and initiating confirmation at that particular speed. The particular speed is selected to be the same as (or an integral scale factor of) the rate at which microprocessor 17 repeats its instruction sequence. When speed detector 25 senses the particular speed, the instruction cycle count 29 is gated to supply a signal indicative of its cycle rate on line 49, and the main microprocessor 15 sends an enable signal via line 33 to failsafe microprocessor 17 to initiate the verification of the computed wheel speed. At compare circuit 45, the speed signal on line 21 is then compared to the rate at which the failsafe computer 17 is repeating its instruction sequence as represented by the signal on line 49. If the two signals do not compare within some predetermined limits, the antilock feature is disabled by a signal on line 43 and vehicle braking reverts to conventional. The instruction cycle count 29 is actually a part of processor 17, but is illustrated separately for clarity. The instruction cycle repetition rate may also be compared to the repetition rate (or a scale factor thereof) of the speed indicative pulse train from sensor 13 as shown in FIG. 2.

Figure 2:
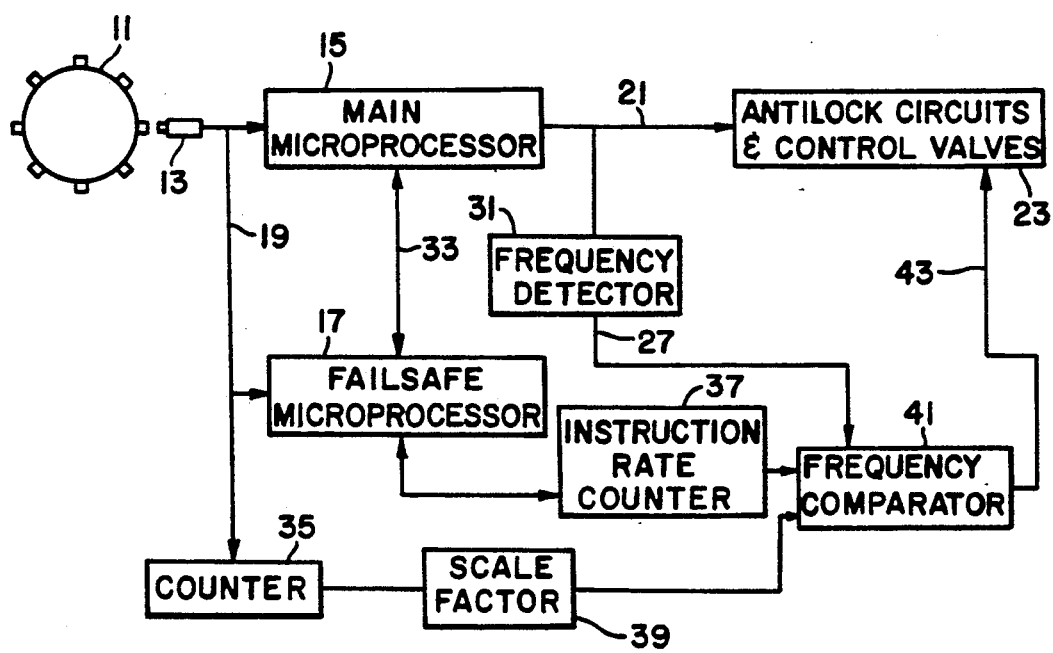
FIG. 2 is a schematic representation of an antilock brake electronic control system similar to that of FIG. 1, but illustrating some of the possible variations on the present invention.

In FIG. 2, the speed indicative signal on line 19 is also supplied to a counter 35 and then multiplied or divided by an appropriate scale factor (e.g. 8 as shown) so that the pulse rate supplied by scale factor circuit 39 to frequency comparator 41 is in wheel revolutions per second. Scale factors other than the number of pulses per revolution may, of course, be used in either the circuit of FIG. 1 or that of FIG. 2 depending on the particular instruction cycle rate of processor 17 and the wheel speed at which confirmation is desired. The instruction rate counter 37 also supplies a pulse train having a repetition rate of one pulse per complete execution of the instruction set of the failsafe microprocessor 17. If the comparator 41 indicates the two pulse trains have the same (within limits) repetition rates, the antilock feature is allowed to continue, but if the comparison is not within safe limits, a signal on line 43 disables the antilock feature as before.

The circuits of FIGS. 1 and 2 implement the same concept in somewhat different ways. Compare circuit 45 of FIG. 1 compares two numbers, one the computed wheel speed from line 21, and the other a number indicative of the time to execute the failsafe processor instruction sequence on line 49. Either number may be appropriately scaled if desired. Comparator 41 of FIG. 2 compares two pulse trains, one a pulse from instruction rate counter 37 for each repetition of its instruction set and the other a pulse train from the wheel speed encoding arrangement on line 19 appropriately scaled if desired. Comparator 41 is enabled to compare these two pulse trains by a signal on line 27 only when the computed wheel speed is detected by frequency detector 31. In either case, the comparison is only effected when the computed wheel speed detected by the speed or frequency detectors is the same as the instruction repetition rate of the failsafe microprocessor 17.

There are numerous particular ways in which the process of confirming wheel speed determination at a particular wheel speed may be accomplished. For example, the main microprocessor 15 detects the wheel speed (perhaps in MPH, RPM, or as a pulse train of specified repetition rate) that correlates with the known failsafe microprocessor 17 software execution loop time whereupon, the processor 15 sends a "verify wheel speed" command to processor 17. Processor 17 looks for a single transition during each software loop at the scale factor 39 output. These translations may be counted by the processor 17 and the number of transitions over a period of time should be the same as the number of software loops. If those two numbers differ by more than some prescribed limits, anti-skid operation is interrupted.

Figure 3:
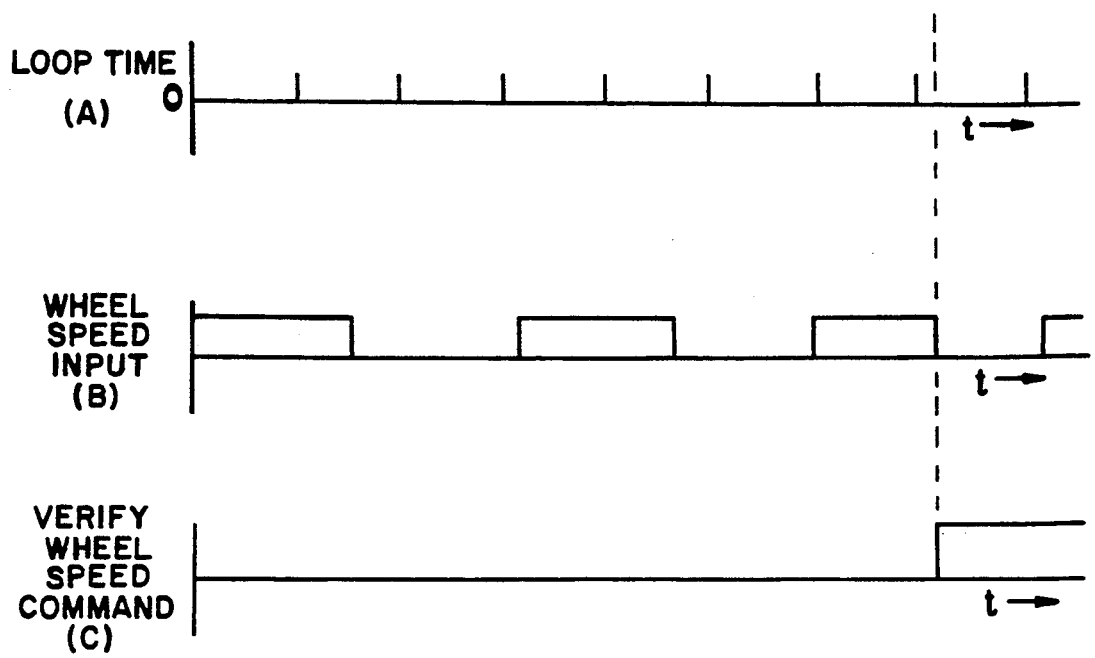
FIG. 3 illustrates the failsafe microprocessor software loop time, wheel speed input for the main and failsafe microprocessors, and the main microprocessor enable signal.
Figure 4:
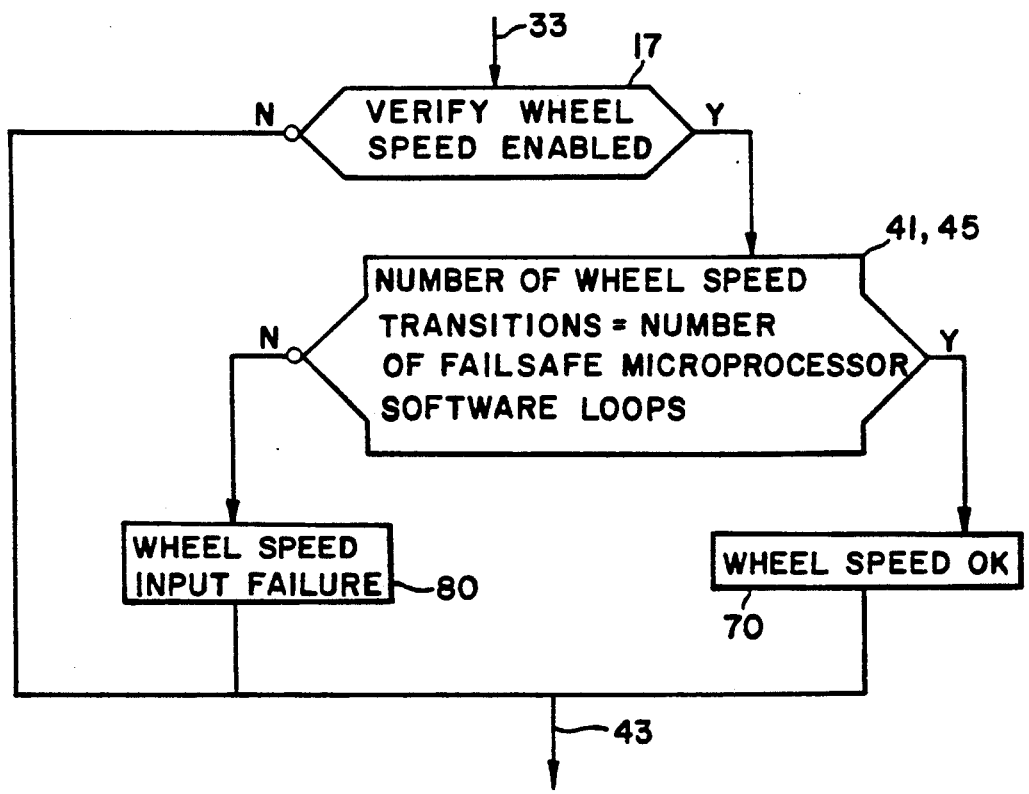
FIG. 4 is a software flow diagram of the wheel speed verification system and process.

FIGS. 3 and 4 are an example of the operation of the wheel speed verification logic. Chart (A) of FIG. 3 shows a failsafe microprocessor software loop time comprising, for example, three millisecond periods. Chart (B) of FIG. 3 shows an asynchronous speed input for the main microprocessor and failsafe microprocessor. In Chart (B) the wheel speed is decreasing to the point where the speed input is synchronous or at approximately the same repetition rate as the failsafe microprocessor software loop time. Upon the speed input matching the failsafe microprocessor software loop time, the main microprocessor sends an enable signal (see Chart (C) of FIG. 3) to the failsafe microprocessor telling the failsafe microprocessor that it can verify the wheel speed. Upon detection of the verified wheel speed signal from the main microprocessor (see FIG. 4) via line 33, the failsafe microprocessor 17 then executes the software steps illustrated in FIG. 4. If the verify wheel speed signal is enabled from the main microprocessor, then, over a time period, a comparison (compare circuit 45 or comparator 41) is made between a number of wheel speed transitions and a number of failsafe microprocessor loop times. If there is a match between these two inputs, then the wheel speed is found to be correct and the main microprocessor software loop is continued (Block 70). Otherwise, if there is a mismatch between the wheel speed transitions and the number of failsafe microprocessor software loop times, then a wheel speed input failure is detected (Block 80) and the antilock braking system is disabled via line 43.

From the foregoing, it is now apparent that a novel error checking feature for a brake control anti-skid arrangement has been disclosed meeting the objects and advantageous features set out hereinbefore as well as others, and that numerous modifications as to the precise shapes, configurations and details may be made by those having ordinary skill in the art. For example, either a magnet or an optical pick-up may be used to provide the speed or position inputs utilized by the system of the present invention. As another example, the computation of speeds at integral multiples of the reciprocal of the failsafe microprocessor loop time are easily confirmed. These as well as other modifications will be recognized by those of ordinary skill in the art and may be made without departing from the spirit of the invention or the scope thereof as set out by the claims which follow.

What is claimed is:

1. In a process of monitoring a motion of a vehicle wheel and controlling an application of a braking force to the wheel to arrest wheel motion so as to prevent wheel locking, a method of confirming a wheel speed determination comprising the steps of:

determining a cycle rate at which a processor repetitively cycles through a list of instructions;

selecting a wheel speed determination at which confirmation is to be effected, the selected wheel speed determination being integrally related to the determined cycle rate;

comparing the selected wheel speed determination at the selected particular wheel speed with the cycle rate at which the processor repetitively cycles through the list of instructions; and interrupting the controlling of the braking force in the event the comparison fails to confirm the wheel speed determination.

2. The method of claim 1, wherein the process includes sensing rotation of the vehicle wheel and providing a pulse train a repetition rate of which is indicative of vehicle speed, and the step of comparing the pulse train repetition rate with the rate at which the processor is repetitively cycling through the list of instructions.

3. The method of claim 1, wherein the process includes sensing rotation of the vehicle wheel and providing a pulse train a repetition rate of which is indicative of vehicle speed and computing the wheel speed from that pulse train, and the step of comparing the computed wheel speed with the determined rate at which the processor repetitively cycles through the list of instructions.

4. The method of claim 3, wherein the pulse train is an integral multiple of the wheel speed in revolutions per minute, the method including the additional step of dividing the pulse train repetition rate by said multiple prior to the step of comparing.

5. In an anti-skid control circuit for a wheeled vehicle, a method of processor computation confirmation where confirmation occurs only at a certain one of computation values, comprising the steps of:

sensing rotation of at least one vehicle wheel and providing a pulse train a repetition rate of which is indicative of vehicle speed;

repetitively executing a predetermined sequence of program steps in a microprocessor over a fixed time interval, the microprocessor repeating the predetermined sequence of program steps during successive fixed time intervals;

repetitively computing the speed of said at least one vehicle wheel in response to the pulse train;

comparing the computed wheel speed to said fixed time interval and allowing the anti-skid control circuit to continue in operation only so long as the compared wheel speed and time interval are within predetermined limits of one another, the comparison being effected only at a certain specific wheel speed.

6. In an anti-skid control circuit for a wheeled vehicle, a method of processor computation confirmation where confirmation occurs only at a certain one of computation values, comprising the steps of:

sensing rotation of at least one vehicle wheel and providing a first pulse train a repetition rate of which is indicative of vehicle speed;

repetitively executing a predetermined sequence of program steps in a microprocessor over a fixed time interval, the microprocessor repeating the predetermined sequence of program steps during successive fixed time intervals;

providing a second pulse train having one pulse for each repetition of the sequence of program steps;

repetitively computing the speed of said at least one vehicle wheel according to the repetition rate of the first pulse train; and comparing the repetition rates of the first and second pulse trains and initiating corrective action in the event that the compared repetition rates differ by more than a prescribed amount, the comparison being effected only at a certain specific wheel speed.

* * * * *